(12) United States Patent
Chen et al.

(10) Patent No.: US 8,566,205 B2
(45) Date of Patent: Oct. 22, 2013

(54) SYSTEM AND METHOD OF MAKING MARKETS FOR A FINITE SUBSET OF ORDERS PLACED ACROSS CONTINUOUS AND COUNTABLY INFINITE OUTCOME SPACES

(75) Inventors: Yiling Chen, Jersey City, NJ (US);
David Myer Pennock, Monroe Township, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 1189 days.

(21) Appl. No.: 11/879,940

(22) Filed: Jul. 18, 2007

(65) Prior Publication Data

US 2009/0024510 A1    Jan. 22, 2009

(51) Int. Cl.
*G06Q 40/00*    (2012.01)
(52) U.S. Cl.
USPC .............................. 705/36 R; 705/35; 705/38
(58) Field of Classification Search
USPC .................................. 705/36 R, 35–45; 707/3
See application file for complete search history.

(56) References Cited

U.S. PATENT DOCUMENTS

| 5,687,968 | A | * | 11/1997 | Tarantino | 273/139 |
| 6,098,051 | A | * | 8/2000 | Lupien et al. | 705/36 R |
| 2005/0124408 | A1 | * | 6/2005 | Vlazny et al. | 463/28 |

FOREIGN PATENT DOCUMENTS

EP    1622078 A1 *    2/2006

* cited by examiner

*Primary Examiner* — Kirsten Apple
(74) *Attorney, Agent, or Firm* — Buchenhorner Patent Law (57) ABSTRACT

An improved system and method is provided for making markets for a finite subset of orders across continuous and countably infinite outcome spaces. To do so, a prediction market engine may be provided to support prediction markets by aggregating information about orders specifying a continuous subspace of a continuous outcome space and orders specifying a subset of a countably infinite set of outcomes. The pricing and/or quantities for orders received may be determined, a response may be sent to traders indicating the pricing or quantities of orders for payment, and the amount owed for accepted orders may be collected. Winning accepted orders may be identified and payout may be made for winning accepted orders. Advantageously, the present invention may support aggregation of more information from market participants in a prediction market to forecast the likelihood of the occurrence of a certain event.

10 Claims, 6 Drawing Sheets

SYSTEM AND METHOD OF MAKING MARKETS FOR A FINITE SUBSET OF ORDERS PLACED ACROSS CONTINUOUS AND COUNTABLY INFINITE OUTCOME SPACES

FIELD OF THE INVENTION

The invention relates generally to computer systems, and more particularly to an improved system and method for making markets for a finite subset of orders placed across continuous and countably infinite outcome spaces.

BACKGROUND OF THE INVENTION

A prediction market provides a central place where people may converge to place orders, such as a betting market for placing bets on the outcome of an event or a financial market for placing orders for trading commodities or securities of uncertain value. In a well-functioning market, the resulting prices can reflect a wealth of information about the expected value of the security, which, in ideal circumstances, may represent the sum total of all information available to all traders. In general, prediction markets can provide forecasts for some future events by aggregating information of participants.

When a future event is or can be treated as a continuous random variable, existing prediction market mechanisms may take one of the following two approaches. The continuous random variable may be discretized into a discrete random variable with finite exclusive outcomes and the probability mass function of the discrete random variable may be predicted. Or some statistic of the continuous random variable, such as the expectation, may be directly predicted. In either case, much information about the continuous random variable is not captured by existing prediction markets.

Other mechanisms in combinatorial prediction markets may provide forecasts of future events by attempting to aggregate more information, but result in dividing traders' attention on market information among an exponential number of outcomes of a joint random variable, making the likelihood of finding agreeable bilateral trades remote. In any case, existing combinatorial prediction markets deal with discrete and finite outcome space. Outcome spaces that are continuous or infinite are discretized into finite outcomes that only allow traders to bet on the finite outcomes. Such a restriction on outcome spaces hinders information aggregation. See for example, L. Fortnow, J. Kilian, D. M. Pennock, and M. P. Wellman, *Betting Boolean-style: A Framework for Trading in Securities Based on Logical Formulas*, Decision Support Systems, 39(1):87-104, 2004; and R. D. Hanson, *Combinatorial Information Market Design*, Information Systems Frontiers, 5(1):107-119, 2003.

What is needed is a system and method for prediction markets that may allow participants to trade on continuous or countable infinite outcomes that allow participants to express their information more freely. Such a system and method should be able to support traders for dealing with continuous or countably infinite outcome spaces directly in order to get more complete and refined information from traders.

SUMMARY OF THE INVENTION

Briefly, the present invention may provide a system and method for making markets for a finite subset of orders across continuous and countably infinite outcome spaces. To do so, a prediction market engine may be provided to support prediction markets by aggregating information about orders specifying continuous subspaces of the continuous outcome space and orders specifying a subset of a countably infinite set of outcomes. In an embodiment, a prediction market engine may include an operably coupled market maker engine for providing services for a market maker such as determining pricing for the orders, and the prediction market engine may also include an operably coupled auctioneer engine in an embodiment for providing services for an auctioneer such as determining quantities for the orders placed across continuous and countably infinite outcome spaces.

The present invention may provide a framework for making markets for a finite subset of orders across continuous and countably infinite outcome spaces. To do so, orders specifying continuous subspaces of the continuous outcome space or orders specifying a subset of a countably infinite set of outcomes may be received. The pricing and/or quantities for orders received may be determined, a response may be sent to traders indicating the pricing or quantities of orders for payment, and the amount owed for accepted orders may be collected. Winning accepted orders may be identified and payout may be made for winning accepted orders.

In an embodiment, a market maker may determine pricing for order received and send a response to traders indicating the price of orders to be accepted. In another embodiment, an auctioneer may determine the quantities of orders to accept and send a response to traders indicating the quantities of accepted orders. In either embodiment, a cost function of a continuous-outcome dynamic pari-mutuel market may be evaluated to determine orders to accept that specify a subspace of the continuous outcome space. And, in either embodiment, a cost function of an infinite-outcome dynamic pari-mutuel market may be evaluated to determine orders to accept that specify a subset of a countably infinite set of outcomes.

The present invention may support many applications for making markets for a finite subset of orders placed across continuous and countably infinite outcome spaces. An online financial application may use the present invention to make a market for trading commodities or securities of uncertain value. Or an application for a prediction market may use the present invention to forecast the likelihood of the occurrence of a particular event. Moreover, the present invention may accordingly be generally used for prediction markets where price discovery may be achieved by trading with sufficient liquidity. Such price discovery for a particular prediction market application may in turn be used to forecast the likelihood of the occurrence of a certain event.

Advantageously, such a prediction of the occurrence of a particular event may result in a better forecast of the event than other methods across many different settings including politics, sports and business. Other advantages will become apparent from the following detailed description when taken in conjunction with the drawings, in which:

DETAILED DESCRIPTION

Exemplary Operating Environment

Figure 1:
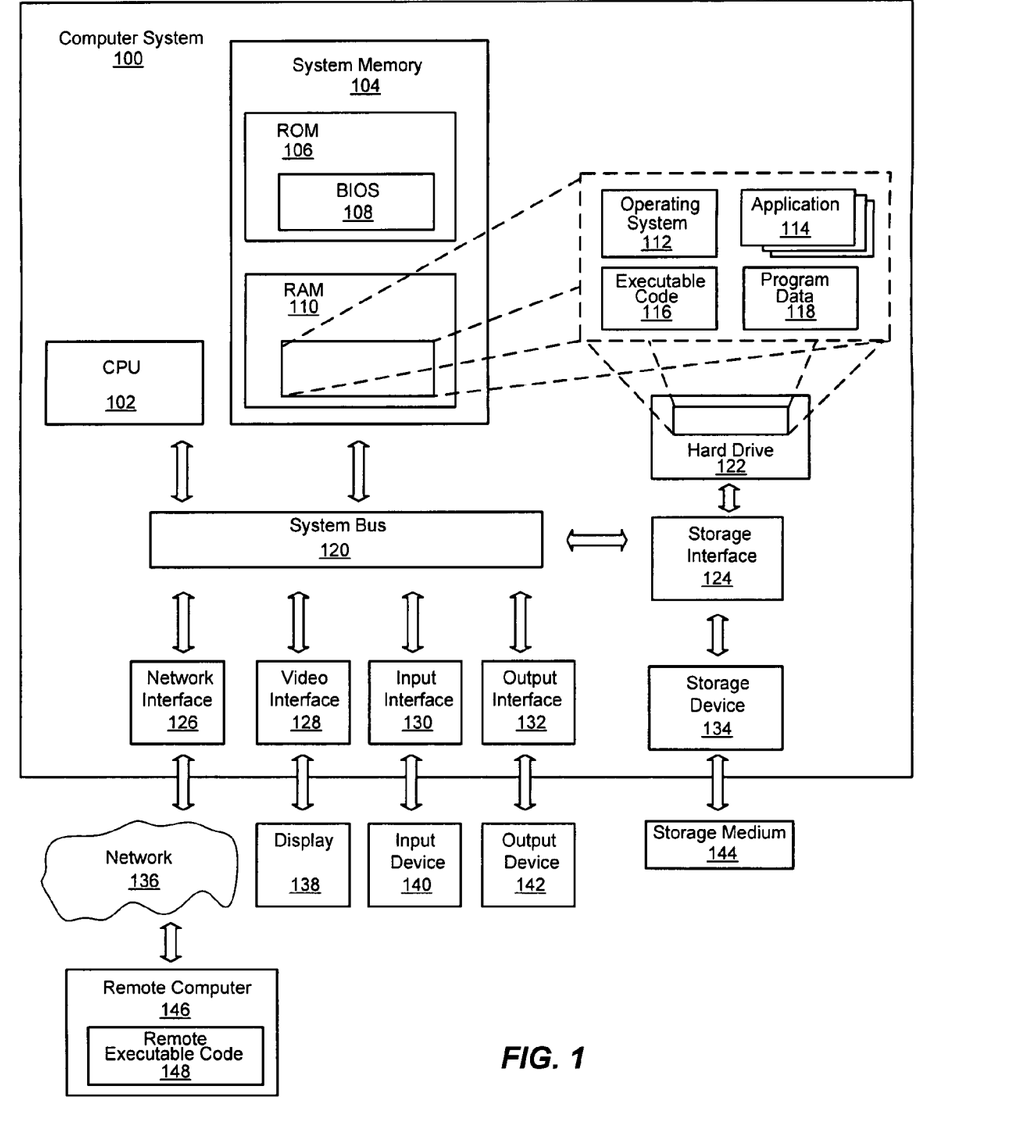
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Making Markets for a Finite Subset of Orders Across Continuous and Countably Infinite Outcome Spaces The present invention is generally directed towards a system and method for making markets for a finite subset of orders placed across continuous and countably infinite outcome spaces. More particularly, a framework for a prediction market may be provided for receiving orders specifying a continuous subspace of a continuous outcome space or orders specifying a subset of a countably infinite set of outcomes. A continuous outcome space may include the real number line, curves, or a high dimensional space. As used herein, a prediction market may mean an information market, a securities market, a contingent claims or contract market, an event market or futures, idea futures, an auction market, and so forth. Orders may mean herein any description of bets including terms of prices and shares, odds, payoff vectors, and the diverse array of descriptions practiced in financial and gambling circles. The pricing and/or quantities for orders received may be determined and a response may be sent to traders indicating the pricing or quantities of orders for payment. Winning accepted orders may be identified and payout may be made for winning accepted orders.

As will be seen, the framework may support a market maker in an embodiment for determining pricing for orders received and will also support an auctioneer in another embodiment for determining quantities for orders received. In various embodiments, the present invention may be generally used for a prediction market to forecast the likelihood of the occurrence of a certain event. As will be understood, the various block diagrams, flow charts and scenarios described herein are only examples, and there are many other scenarios to which the present invention will apply.

Figure 2:
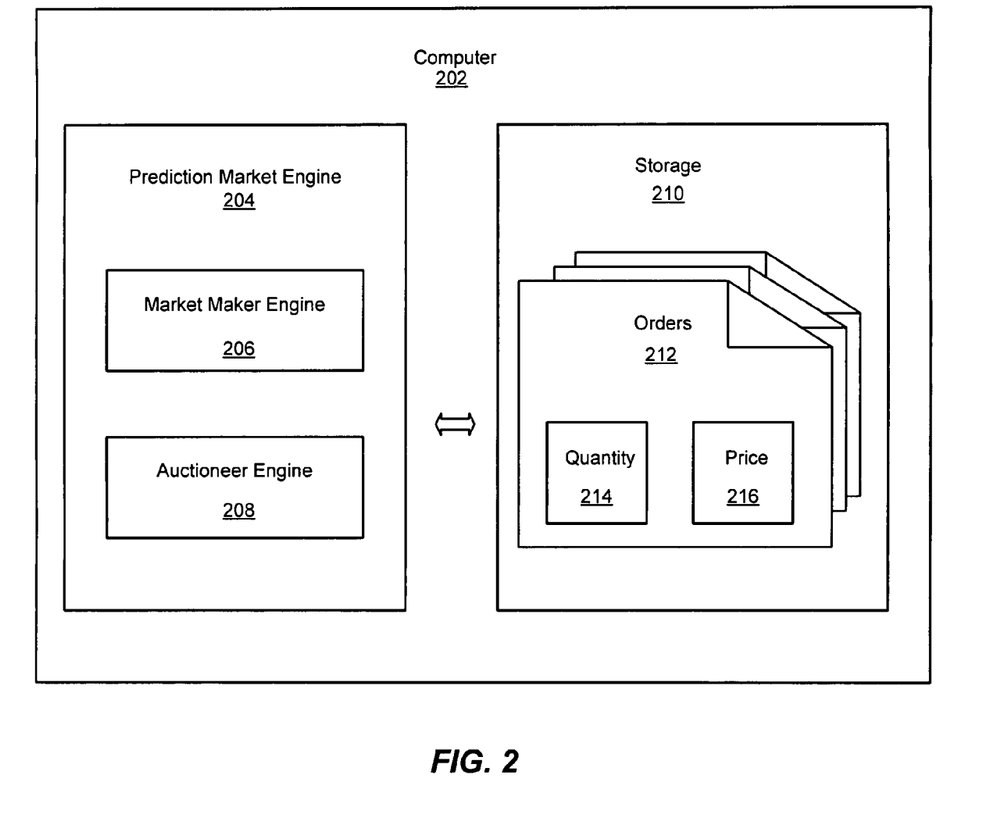
FIG. 2 is a block diagram generally representing an exemplary architecture of system components for making markets for a finite subset of orders placed across continuous and countably infinite outcome spaces, in accordance with an aspect of the present invention.

Turning to FIG. 2 of the drawings, there is shown a block diagram generally representing an exemplary architecture of system components for making markets for a finite subset of orders across continuous and countably infinite outcome spaces. Those skilled in the art will appreciate that the functionality implemented within the blocks illustrated in the diagram may be implemented as separate components or the functionality of several or all of the blocks may be implemented within a single component. For example, the functionality of the market maker engine 206 may be implemented as a separate component from the prediction market engine 204. Moreover, those skilled in the art will appreciate that the functionality implemented within the blocks illustrated in the diagram may be executed on a single computer or distributed across a plurality of computers for execution.

In various embodiments, a computer 202, such as computer system 100 of FIG. 1, may include a prediction market engine 204 operably coupled to storage 210. In general, the prediction market engine 204 may be any type of executable software code such as a kernel component, an application program, a linked library, an object with methods, and so forth. The storage 210 may be any type of computer-readable media and may store orders 212 that may include information such as quantity 214 and price 216.

The prediction market engine 204 may provide services for supporting prediction markets that may aggregate information about predicted continuous random variables in order to allow participants of the prediction market to place a finite number of orders on continuous or countably infinite outcomes. In an embodiment, the orders 212 may be either a buy order or a sell order and may be represented by a description of the order for sale or purchase and may include a quantity and price. The order description may specify a commodity, a security, or more generally, the outcome of an event. The prediction market engine 204 may include a market maker engine 206 for providing services to make a market for placing a finite number of orders across continuous and countably infinite outcomes, and an auctioneer engine 208 for providing services to make a market for auctioning a finite number of orders placed across continuous and countably infinite outcomes. Each of these modules may also be any type of executable software code such as a kernel component, an application program, a linked library, an object with methods, or other type of executable software code.

There are many applications which may use the present invention for making markets for a finite subset of orders placed across continuous and countably infinite outcome spaces. For example, an online financial application may use the present invention to make a market for trading commodities or securities of uncertain value. Or an application for a prediction market may use the present invention to forecast the likelihood of the occurrence of a particular event. For instance, a policymaker seeking a forecast of the likelihood of where a hurricane may strike the coast may use the present invention for making a prediction market in which traders can trade securities of their own choices that specify a segment of the coast line and pay $1 if and only if the hurricane strikes land within the specified segment of the coast line. With sufficient liquidity, traders of the security may reflect their collective information about the value of the security and correspondingly about the likelihood where a hurricane may strike the coast. Those skilled in the art will appreciate that the present invention may accordingly be generally used for prediction markets where price discovery is a goal that may be achieved by trading with sufficient liquidity. Such price discovery for particular prediction market application may in turn be uses to forecast the likelihood of the occurrence of a certain event. Empirically, such prediction markets may often yield better forecasts of future events than other methods across many different settings including politics, sports and business.

There may be various ways for making markets for a finite subset of orders placed across continuous and countably infinite outcome spaces. For forecasting a future event as an example, the future event may be treated in an embodiment as a continuous random variable that may correspond to countably infinite exclusive outcomes. Alternatively, the future event may be treated in another embodiment as a continuous random variable that may correspond to a point on the real line. In yet another embodiment, the future event may be treated as a continuous random variable that may correspond to a point within a fixed interval.

Figure 3:
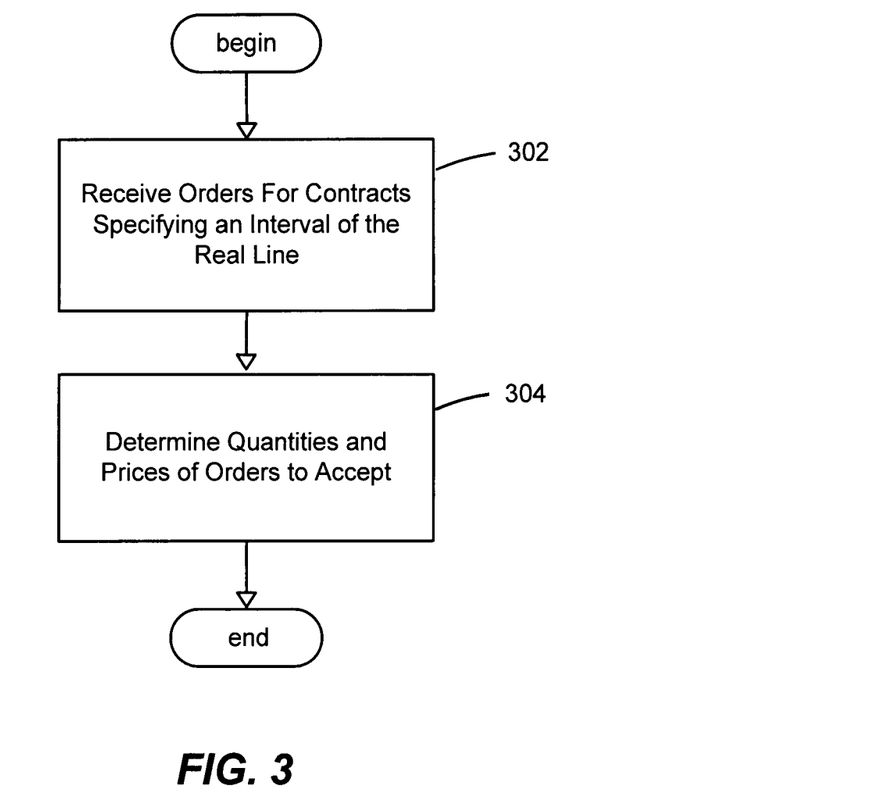
FIG. 3 is a flowchart generally representing the steps undertaken in one embodiment for making markets for placing orders across a continuous outcome space such as the real-line, in accordance with an aspect of the present invention.

FIG. 3 presents a flowchart generally representing the steps undertaken in one embodiment for making markets for placing orders across a continuous interval of the real-line. If a forecast variable may be a continuous real-valued random variable, the real line or part of the real line is its outcome space. A prediction market trying to obtain a probability density function for the random variable ideally should allow people to bet on any interval or bundles of intervals on the real line. In an embodiment, a dynamic pari-mutuel market (DPM) can be generalized to provide a continuous-outcome DPM to allow betting on the real line.

In a DPM, traders who wager on the true outcome may split the total pool of money at the end of the market. However, the cost (price) of a single share varies dynamically according to some price functions, thus allowing trader to sell their shares prior to the determination of the outcome for profits or losses. A natural way for a market maker to set security (or order) prices in a DPM is to equate the ratio of prices of any two securities (or orders) with the ratio of the number of shares outstanding for the two securities (or orders). Consider $\vec{q}=(q_1, q_2, \ldots, q_N)$ to denote a vector of shares outstanding for securities (or orders). Then, the total money wagered in the market may be denoted by the cost function, $$C(\vec{q}) = \kappa \sqrt{\sum_{j=1}^{N} q_j^2},$$

and the instantaneous price may be denoted by the price function, $$p_i(\vec{q}) = \frac{\kappa q_i}{\sqrt{\sum_{j=1}^{N} q_j^2}},$$

where κ is a free parameter.

If outcome i may happen and the quantity vector at the end of the market may be denoted as $\vec{q}^f$, the pay-off for each share of the winning security may be denoted as $$o_i = \frac{C(\vec{q}^f)}{q_i^f} = \frac{\kappa \sqrt{\sum_{j}(q_j^f)^2}}{q_i^f}.$$

Returning to FIG. 3, orders for contracts specifying an interval of the real-line may be received at step 302. For example, buy or sell orders may be received from a trader specify buying or selling δ shares of interval (a,b). In an embodiment of a continuous-outcome DPM that may allow betting on the real line, a market maker engine may increase a vector of shares outstanding for orders, q(x), by δ for all x∈(a,b). At step 304, the quantities and prices of orders to accept may be determined. For example in an embodiment of a continuous-outcome DPM, the cost and price may be determined using the cost function $$C = \kappa \sqrt{\int_{-\infty}^{+\infty} q(y)^2 dy}$$

and the price function $$p(x) = \frac{\kappa q(x)}{\sqrt{\int_{-\infty}^{+\infty} q(y)^2 dy}},$$

∀i. The trader's payment may equal the value differences in the cost function. However, strictly speaking function $$p(x) = \frac{\kappa q(x)}{\sqrt{\int_{-\infty}^{+\infty} q(y)^2 dy}},$$

∀i, does not represent price, but is more like a density function. The instantaneous price for buying an infinitely small number of a security for interval (a,b) may be determined using the price function $$p_{(a,b)} = \int_a^b p(x) dx = \frac{\kappa \int_a^b q(x) dx}{\sqrt{\int_{-\infty}^{+\infty} q(y)^2 dy}}.$$

If the realized value of the random variable is x*, each share of a security on any interval that contains x* entitles its holder an equal share of the total money in the market. Thus, the payoff per share may be determined using the payout function, $$o(x^*) = \frac{C}{q^f(x^*)} = \frac{\kappa \sqrt{\int_{-\infty}^{+\infty} q^f(y)^2 dy}}{q^f(x^*)},$$

where $q^f(y)$ is the number of outstanding shares for securities whose interval contains y at the end of the market.

In various embodiments, a market maker engine may accept the quantities specified by orders and determine the price using the cost and price functions of a continuous-outcome DPM and may accept quantity orders at a loss, in return for improving trader incentives, liquidity and price discovery. A market maker engine utilizing a continuous-outcome DPM can choose an initial quantity distribution $q^0(x)$ for bounding any loss to a finite loss. The price per share for buying a security on interval (a,b) is always less than or equal to $\kappa\sqrt{b-a}$. If traders can bet on any non-empty open interval, the payoff per share may be bounded below by 0. If traders may be restricted to bet only on open intervals of size at least z, the payoff per share may be bounded below by $$\frac{\kappa \sqrt{2z}}{2}.$$

In various other embodiments, an auctioneer engine may accept bids as the price amount and may determine quantities of orders so that the auctioneer may not suffer any loss.

Figure 4:
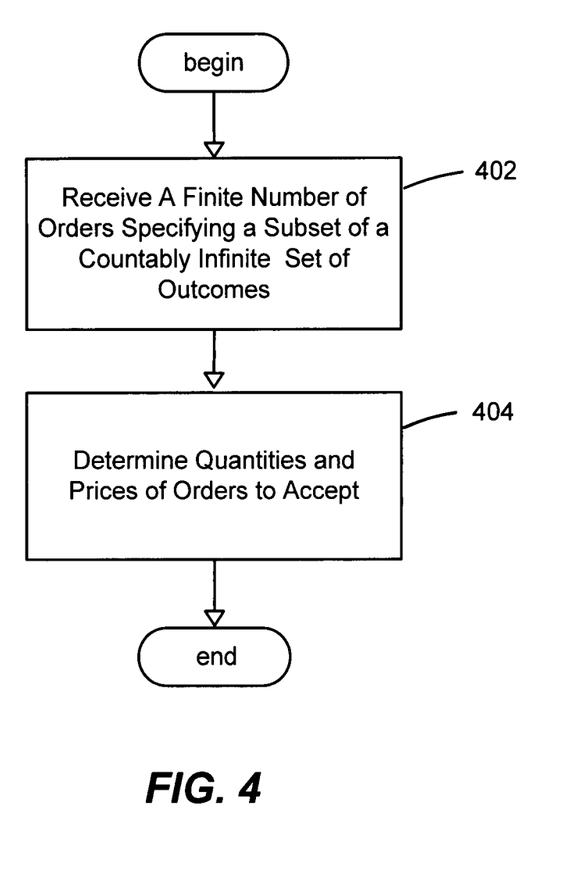
FIG. 4 is a flowchart generally representing the steps undertaken in one embodiment for making markets for a finite subset of orders across a countably infinite set of outcomes, in accordance with an aspect of the present invention.

Those skilled in the art will appreciate that the present invention may also be applied to other continuous subspaces of a continuous output space, including real lines, curves, high dimensional spaces, and so forth. In addition to random forecast variables that have a continuous outcome space, many random forecast variables of interest have a countably infinite outcome space. FIG. 4 presents a flowchart generally representing the steps undertaken in an embodiment for making markets for a finite subset of orders across a countably infinite set of outcomes. At step 402, a finite number of orders each specifying one potential outcome of a countably infinite set of outcomes may be received. For example, buy or sell orders may be received from a trader specify buying or selling shares where each share may correspond to one potential outcome of a countably infinite set of outcomes. In an embodiment, a dynamic pari-mutuel market (DPM) can be generalized to provide an infinite-outcome DPM to allow trading on a countably infinite set of outcomes. For example, the underlying forecast variable in an infinite-outcome DPM can have countably infinite mutually exclusive and exhaustive outcomes. Each security may correspond to one potential outcome and a market maker engine may keep track of the quantity vector of outstanding securities, denoted as $\vec{q}$. In practice, a market maker utilizing an infinite-outcome DPM can start with a quantity vector that has only finite positive elements and all others are zeros. Whenever a trader purchases a security whose current price is zero or that has not been purchased before, the market maker engine may begin to track quantity and calculate price for that security. Hence, infinite-outcome DPM can be operated as a finite-outcome DPM that can add new securities on the fly.

At step 404, the quantities and prices of orders to accept may be determined. The cost and price for the infinite-outcome DPM may be determined using the cost function $$C^I(\vec{q}) = \kappa \sqrt{\sum_{j=1}^{\infty} q_j^2}$$

and the price function $$p_i^I(\vec{q}) = \frac{\kappa q_i}{\sqrt{\sum_{j=1}^{\infty} q_j^2}},$$

where $\kappa$ is a free parameter. In practice, the market maker engine does not need to record quantities and calculate prices for all infinite outcomes, but only for the finite number of infinite outcomes having outstanding shares.

The payoff per winning security if outcome i happens may be determined using the payout function $$O_i^I = \frac{C^I(\vec{q}^f)}{q_i^f} = \frac{\kappa \sqrt{\sum_{j=1}^{\infty} (q_j^f)^2}}{q_i^f}.$$

The loss of the market maker in an infinite-outcome DPM may generally be the cost to initiate the market and the market maker engine may choose a $\vec{q}^0$ such that the loss $c^I(\vec{q}^0)$ may be finite. For instance, the market maker engine may start with a quantity vector that has only finite positive elements. Advantageously, payoff of a security in an infinite-outcome DPM may always be greater than or equal to $\kappa$ and the price of a security may always be less than or equal to $\kappa$.

Figure 5:
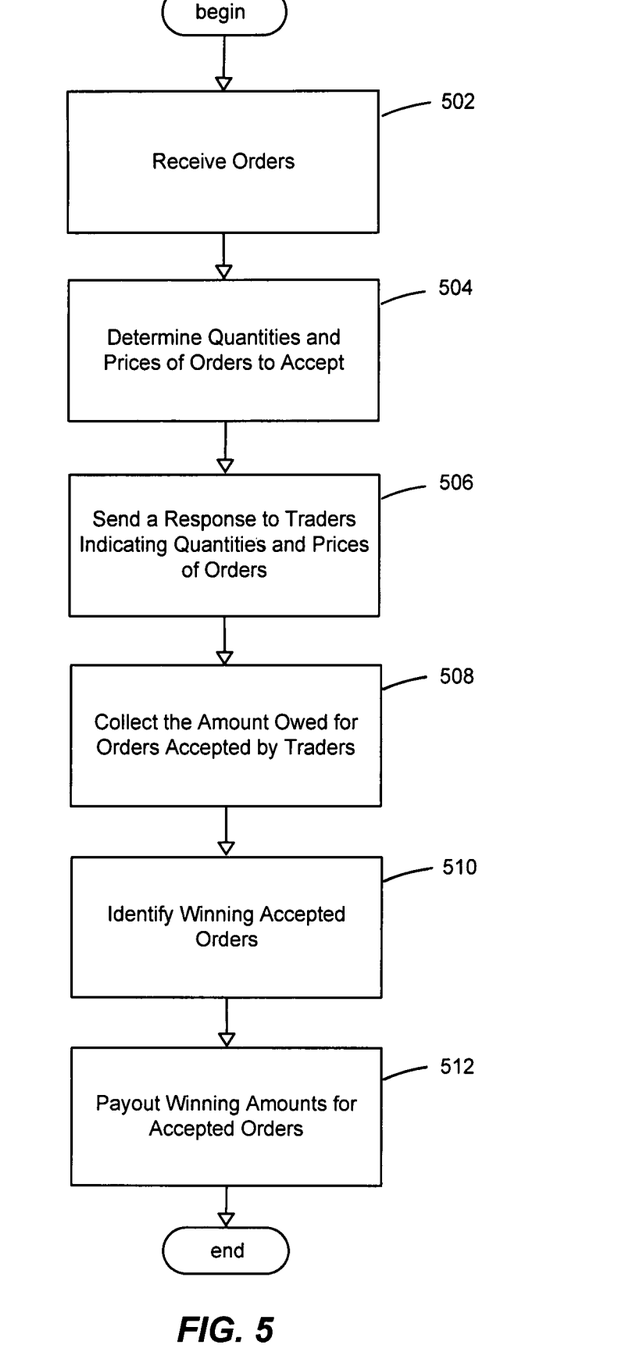
FIG. 5 is a flowchart generally representing the steps undertaken in one embodiment for a market maker engine to make a market for a finite subset of orders across continuous and countably infinite outcome spaces, in accordance with an aspect of the present invention.

FIG. 5 presents a flowchart generally representing the steps undertaken in one embodiment for a market maker engine to make a market for a finite subset of orders across continuous and countably infinite outcome spaces. At step 502, orders may be received. For instance, buy or sell orders for contracts, each specifying an interval of the real-line in one embodiment, or, alternatively, each specifying one potential outcome of a countably infinite set of outcomes in another embodiment, may be received by a market maker engine. At step 504, the quantities and prices of orders to accept may be determined. In various embodiments, a market maker engine may determine the price of orders and may accept the quantity of orders requested. A market maker may decide to accept the quantity of orders received even at a loss, in return for improving trader incentives, liquidity and/or price discovery. For contracts specifying an interval of the real-line, a market maker engine may determine the price using the cost and price functions of a continuous-outcome DPM as described above in conjunction with FIG. 3. Or, for contracts specifying one potential outcome of a countably infinite set of outcomes, a market maker engine may determine the price using the cost and price functions of an infinite-outcome DPM as described above in conjunction with FIG. 4.

At step 506, a response indicating quantities and prices of orders may be sent to traders. The amount owed for orders accepted by traders may be collected at step 508. For instance, the amount owed for the orders may be collected using an electronic payment system such as a purchase order transaction system, electronic commerce system, or other type of online system that may accept payment.

At step 510, accepted orders that win may be identified. The winning amounts for accepted orders may be paid out at step 512. For contracts specifying an interval of the real-line, a market maker engine may determine the payout using the payout function of a continuous-outcome DPM as described above in conjunction with FIG. 3. Or, for contracts specifying one potential outcome of a countably infinite set of outcomes, a market maker engine may determine the payout using the payout function of an infinite-outcome DPM as described above in conjunction with FIG. 4.

Figure 6:
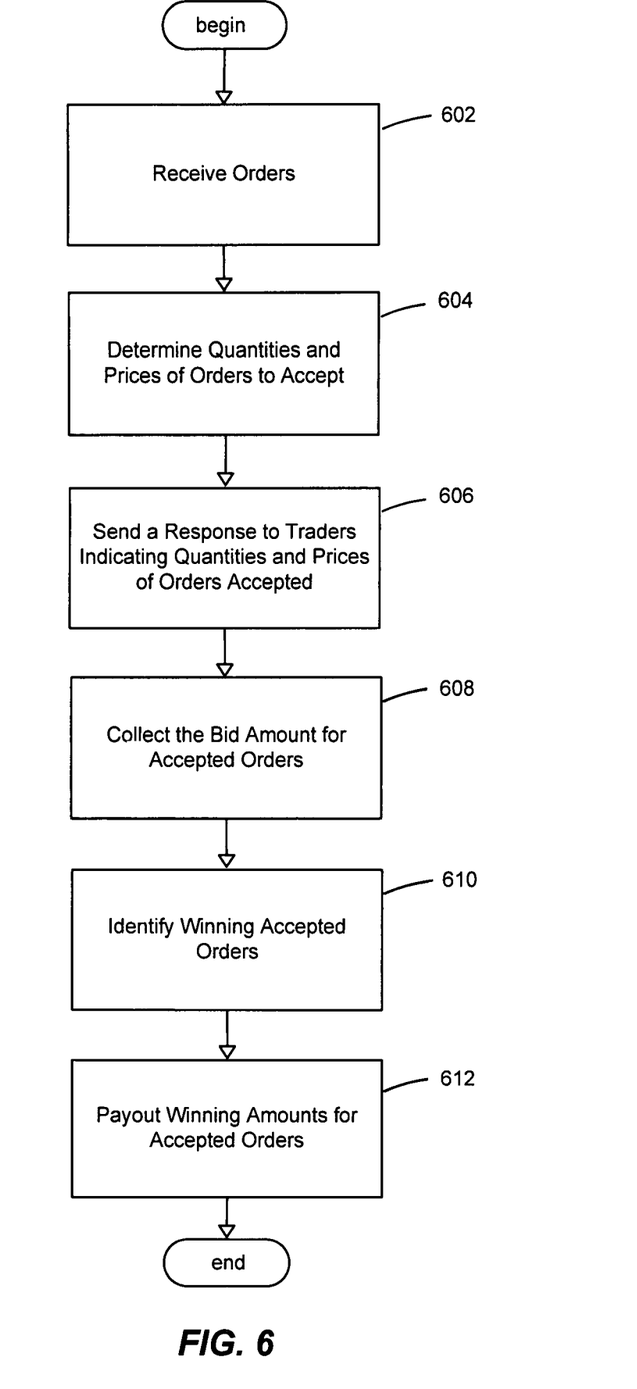
FIG. 6 is a flowchart generally representing the steps undertaken in one embodiment for an auctioneer engine to make a market for a finite subset of orders across continuous and countably infinite outcome spaces, in accordance with an aspect of the present invention.

FIG. 6 presents a flowchart generally representing the steps undertaken in an embodiment for an auctioneer engine to make a market for a finite subset of orders across continuous and countably infinite outcome spaces. At step 602, orders may be received. In one embodiment, buy or sell orders may be received by an auctioneer engine for contracts specifying an interval of the real-line. In another embodiment, buy or sell orders may be received by an auctioneer engine for contracts specifying one potential outcome of a countably infinite set of outcomes. At step 604, the quantities and prices of orders to accept may be determined. In various embodiments, an auctioneer may determine the quantity of orders to accept and may accept the price of orders received without suffering any loss.

At step 606, a response indicating quantities and prices of orders accepted may be sent to traders. The bid amount for orders accepted may be collected from traders at step 608. For instance, the bid amount for the orders may be collected using an electronic payment system such as a purchase order transaction system, electronic commerce system, or other type of online system that may accept payment.

At step 610, accepted orders that win may be identified. For example, a match may be found for a seller and buyer of an order according to auction rules and the winning bid amounts for accepted orders may be payed out at step 612. For contracts specifying an interval of the real-line, an auctioneer engine may determine the payout using the payout function of a continuous-outcome DPM as described above in conjunction with FIG. 3. Or, for contracts specifying one potential outcome of a countably infinite set of outcomes, an auctioneer engine may determine the payout using the payout function of an infinite-outcome DPM as described above in conjunction with FIG. 4.

Those skilled in the art will appreciate that other prediction market mechanisms may be used by a market maker engine or auctioneer engine to predict a random variable with continuous or countably infinite outcomes. For example, a logarithmic scoring rule for price and cost function may be defined to accommodate infinite and continuous outcomes. A logarithmic scoring rule for a continuous random variable may be defined as $s(r(x))=b\log(r(x))$ when x may be the realized value for the random variable and r(x) may be the reported probability density function for the random variable evaluated at x. The corresponding cost function and price functions for a continuous logarithmic market scoring rule market maker may be $$C = b\log\left(\int_{-\infty}^{+\infty} e^{q(y)/b} dy\right) \text{ and } p(x) = \frac{e^{q(x)/b}}{\int_{-\infty}^{+\infty} e^{q(y)/b} dy}$$

respectively

As in the continuous-outcome DPM, p(x) does not represent price, but is more like a density function. The instantaneous price for buying an infinitely small number of a security for interval (a,b) may be $$\int_a^b p(x)dx.$$

If the realized value of the random variable may be contained by the interval (a,b), each share of the security entitles its holder to a payoff. However, the worst-case loss may be unbounded for a continuous logarithmic market scoring rule market maker even with the restriction on size of intervals.

In yet another embodiment, traders may propose to buy securities and the market maker or auctioneer may solve a linear programming problem to determine the quantities and prices of orders to accept. Consider an index set of orders $O_t$ which the market receives at time t. Each order $O_t$ may denote a triple $(b_i, q_i, \phi_i)$, where $b_i$ denotes how much the trader is willing to pay for a unit share of security $\phi_i$ and $q_i$ may denote the number of shares of the security the trader wants to purchase at price $b_i$. Naturally, $b_i \in (0,1)$ since a unit of the security may pay off at most $1 when the event is realized.

An order i may specify a continuous subspace if the outcome space may be continuous, for example, an interval on the real line, an area in a two dimensional plane, or a continuous segment of a curve. An order i may specify a subset of outcomes if the outcome space is countably infinite. The number of orders may be finite.

The set of orders $O_t$ at time t may partition the outcome space into finite discrete states. Consider $S_t$ to denote the state space at time t, and $s_t \in S_t$ to denote a particular state. For example, if the outcome space may be the real line, after getting an order to buy 3 shares of interval (1,2) at price $0.6, the outcome space may be partitioned into 3 states, $(-\infty, 1]$, $(1,2)$, and $[2,+\infty)$. If the order may be accepted, the trader may get $1 per share if state (1,2) is realized. The state space $S_t$ may change with the set of orders $O_t$ at time t.

Then an auctioneer engine or a market maker engine may solve a linear programming problem at each time point t when new orders come in, defined as follows:

$$\max_{x_i, c} \sum_i x_i \text{ s.t. } \sum_i (b_i - I_i(s_t))q_i x_i \geq c,$$

$$\forall s_t \in S_t, 0 \leq x_i \leq 1, \forall i \in O_t,$$

where $x_i$ is the quantity accepted for order i, and the variable c is the maximum loss that the market maker is willing to bear. When c=0, the market may be essentially run by an auctioneer who does not bear any risk. When c<0, the market may be run by a market maker who is willing to subsidize the market for at most c dollars.

The mechanism can have different optimization objectives, such as total trading volume or worst-case loss. The objective of solving the linear programming problem defined as $$\max_{x_i, c} \sum_i x_i \text{ s.t. } \sum_i (b_i - I_i(s_t))q_i x_i \geq c,$$

$$\forall s_t \in S_t, 0 \leq x_i \leq 1, \forall i \in O_t,$$

is to maximize the total trading volume. In this case, the above linear programming problem assumes that orders are divisible. If $x_i$'s are indivisible, the auctioneer engine and the market maker engine may solve an integer programming problem at each time t defined as:

$$\max_{x_i, c} \sum_i x_i \text{ s.t. } \sum_i (b_i - I_i(s_t))q_i x_i \geq c,$$

$$\forall s_t \in S_t, x_i \in \{0,1\}, \forall i \in O_t.$$

Thus the present invention may provide prediction market mechanisms that may be used by a market maker engine or auctioneer engine to predict a random variable with continuous or countably infinite outcomes. The present invention may allow participants in prediction markets to trade on continuous or countable infinite outcomes and express their information more freely. Advantageously, such a system and method may support aggregation of more information from market participants for supporting market liquidity. Furthermore, by providing aggregation of more information, the prediction of the occurrence of a particular event may result in a better forecast of the event in any number of applications.

As can be seen from the foregoing detailed description, the present invention provides an improved system and method for making markets for a finite subset of orders across continuous and countably infinite outcome spaces. The present invention may support many applications for making markets for a finite subset of orders placed across continuous and countably infinite outcome spaces. For instance, an online financial application may use the present invention to make a market for trading commodities or securities of uncertain value. Such a system and method may support many applications for prediction markets to forecast the likelihood of the occurrence of a particular event. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for a prediction market, comprising:
a processor device performing as a prediction market engine providing services to support prediction markets aggregating information about orders placed on a continuous interval of a continuous outcome space by performing steps of:
receiving a plurality of orders from a plurality of traders, each order specifying a non-empty open continuous interval of the continuous outcome space;
determining prices of the orders to accept using a payout function of a continuous-outcome dynamic pari-mutuel market;
transmitting information to traders in the prediction market, said information comprising the quantities and the prices of the orders;
collecting amounts owed for the orders accepted by the traders;
identifying winning accepted orders;
determining winning amounts; and
paying out the winning amounts for the accepted orders; and
a storage operably coupled to the processor device storing the orders placed on the continuous intervals of the continuous outcome space.

2. The system of claim 1 further comprising an auctioneer engine operably coupled to the processor device, determining quantities for the orders placed on the continuous interval of the continuous outcome space.

3. A computer-readable medium having computer-executable components comprising the system of claim 1.

4. A computer-implemented method of operating a prediction market, comprising:
using a processor device, performing steps of:
receiving a plurality of orders, each order specifying a non-empty open continuous interval of a continuous outcome space from a plurality of traders in the prediction market;
determining prices of the orders to accept using a payout function of a continuousoutcome dynamic pari-mutuel market;
transmitting information to the traders in the prediction market, said information comprising the quantities and the prices of the orders;
collecting an amount for the at least one order of the plurality of orders accepted from at least one trader of the plurality of traders;
identifying at least one winning accepted order;
determining winning amounts; and
paying out a winning amount for the at least one winning accepted order.

5. The method of claim 4 wherein determining the winning amounts comprises evaluating a pricing function of a continuous-outcome dynamic pari-mutuel market.

6. The method of claim 4 wherein determining the pricing further comprises evaluating a cost function of a continuous-outcome dynamic pari-mutuel market.

7. The method of claim 4 wherein paying out the winning amount for the at least one winning accepted order comprises evaluating the payout function of a continuous-outcome dynamic pari-mutuel market to determine the winning amount.

8. The method of claim 4 further comprising determining a quantity of the orders specifying the continuous interval of the continuous outcome space.

9. The method of claim 8 wherein determining the quantity of the orders comprises evaluating a cost function of a continuous-outcome dynamic pari-mutuel market.

10. A computer-readable medium having computer-executable instructions for performing the method of claim 4.

* * * * *